Jan. 6, 1925.

H. R. HUGHES, JR 1,522,243

SHOCK ABSORBER

Filed Aug. 7, 1923

HOWARD R. HUGHES JR. Inventor

By Jesse R. Stone

Attorney

Patented Jan. 6, 1925.

1,522,243

UNITED STATES PATENT OFFICE.

HOWARD R. HUGHES, JR., OF HOUSTON, TEXAS.

SHOCK ABSORBER.

Application filed August 7, 1923. Serial No. 656,156.

*To all whom it may concern:*

Be it known that I, HOWARD R. HUGHES, Jr., a citizen of the United States, residing at Houston, Harris County, Texas, have invented a certain new and useful Improvement in Shock Absorbers, of which the following is a full, clear, and exact description, such as will enable others skilled in the art to which it appertains to make and use the same.

My invention relates to shock absorbers, and is particularly designed for use on motor vehicles to take up the vibration and shock of traffic over rough or irregular surfaced roadways.

An object is to provide a shock absorber of the fluid type which will absorb a shock delivered through the wheels of the vehicle, and also prevent the usual recoil taking place after the direct shock has been delivered.

Figure 2:
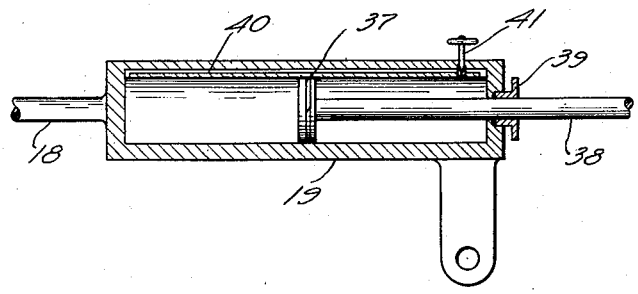
Figure 1:
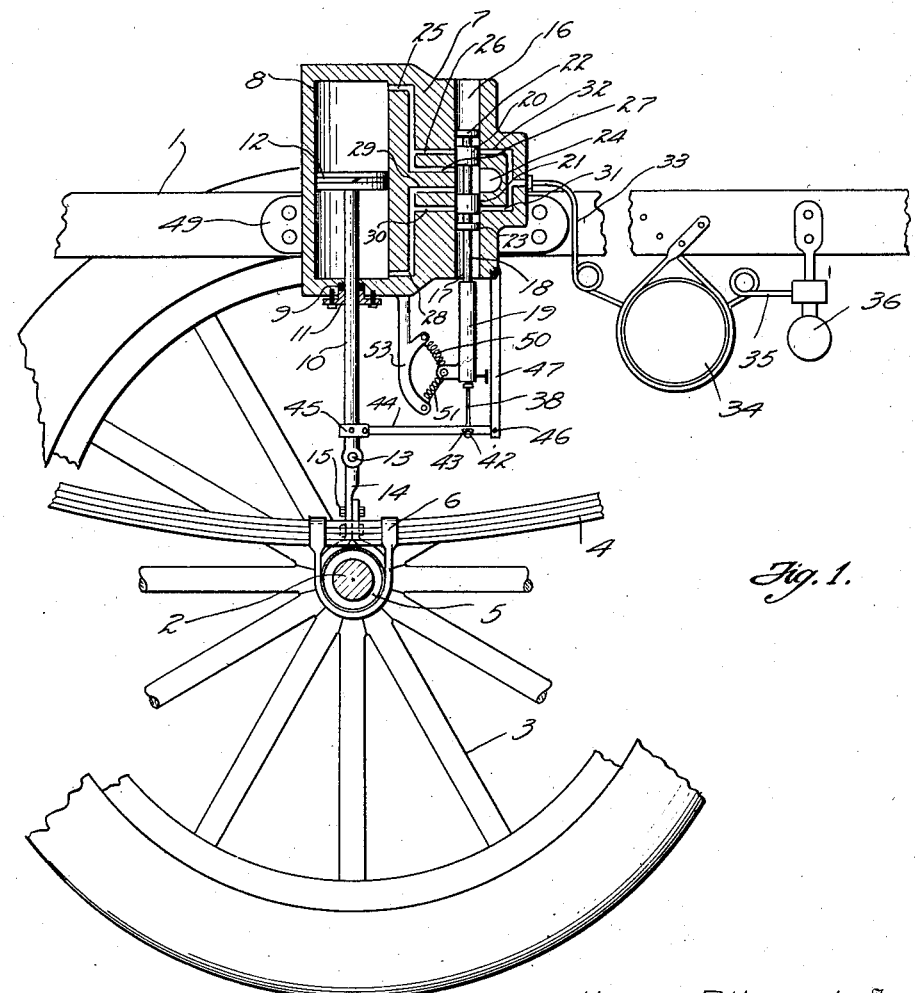

Another object is to provide a shock absorber of simple construction which will work silently and smoothly. Other objects and advantages and the means by which such objects are accomplished will more clearly appear from the description which follows:

Referring to the drawing herewith wherein like numerals of reference are applied to like parts in both of the views, Fig. 1 is a broken detail of a vehicle frame and spring showing my invention applied thereto. Fig. 2 is a longitudinal section through a dash pot used in connection with the invention.

In the drawing the numeral 1 is applied to a side supporting member of the vehicle chassis. The side frame is supported upon an axle 2 of a wheel 3 by means of an intervening spring 4 of the usual elliptical construction. Said spring is secured rigidly to a housing 5 surrounding the axle 2 by means of a stirrup 6 in the usual manner. The spring 4 is contemplated as being attached to the frame of the vehicle by means of shackles or otherwise.

The shock absorbing apparatus comprises a special casting 7, having at one side thereof a cylinder 8 closed at its upper end, and having an opening 9 in the lower end to receive a piston rod 10, said piston rod being adapted to reciprocate through a stuffing box 11. Within the cylinder 8 is the piston 12 secured to the forward end of the piston rod previously described. The lower end of the said piston rod is pivoted at 13 to a bracket 14 adapted to be clamped around the housing 5 for the wheel axle by means of bolts and nuts 15 as shown in Fig. 1.

At one side of the cylinder 8 is a longitudinal chamber or channel 16 within which is slidable a valve gear 17. This valve gear comprises a rod 18 mounted upon the upper end of the cylinder 19 of a dash pot which will be presently described. Within the chamber or cylinder 16 are two piston valves 20 and 21. Above the piston 20, and spaced slightly therefrom, is a smaller piston 22. A similar piston 23 is spaced slightly below the valve 21. Between the two pistons 20 and 21 is a small chamber communicating by means of an opening 24 in the walls of the cylinder with the atmosphere.

At the upper end of the cylinder 8 is a laterally extending channel 25 which is turned downwardly and has two ducts 26 and 27 communicating with the valve cylinder 16. At the lower end of the cylinder 8 a similar channel 28 is connected with the valve cylinder 16 by means of two ducts 29 and 30.

On the side of the cylinder 16 at points normally closed by the valve pistons 20 and 21 are channels 31 and 32, connected with an inlet pipe 33 coming from a compression chamber 34 for air or other fluid under pressure. This chamber 34 is connected by means of a pipe 35 to an air compressor shown diagrammatically at 36. It is contemplated that this air compressor shall be an automatically operated compressor of any ordinary type, and may be actuated by means of a motor and storage battery or from the operating parts of the vehicle as desired, this compressor not being an essential part of my invention.

Working within the cylinder 19 of the dash pot is a piston 37 mounted on the upper end of a piston rod 38. This piston rod reciprocates through a stuffing box 39 in the lower end of said cylinder. As shown particularly in Fig. 2, the cylinder 19 has a small by-pass 40 connecting one end of said cylinder with the other end. A small needle valve 41 in said passage 40 tends to regulate the amount of air or liquid passing therethrough. The lower end of the piston rod 38 is connected at 42 within a slot 43 in a lever arm 44. Said lever arm is secured at one end to a shackle 45 mounted upon the lower end of the piston rod 10. At its other end the lever 44 is pivoted at 46 to the lower end of a link 47 secured to the lower end of the casting 7 to the rear of the cylinder 16.

The shock absorbing apparatus thus described is securely mounted upon the frame 1 by means of brackets 49 on each side thereof as shown in the drawing.

In the operation of this device the normal position of the valve pistons 20 and 21 will close the channels 26 and 30 leading to the cylinder 8, and will allow the openings 27 and 29 to communicate with the atmosphere, thus maintaining the usual atmospheric pressure above and below the piston 12 of the shock absorbers. When a shock is delivered upwardly upon the wheel axle due to some irregularity or obstruction in the road, the force of the shock will tend to force the spring 4 upwardly to compress the same, and at the same time will force the piston upwardly in the cylinder 8. As the piston is thus thrown upwardly, the rod 38 in the dash pot will be thrown upwardly therein, thus imparting an upward motion to the cylinder 19 of the dash pot and to the valve rod. The slight upward motion imparted to the rod will force the piston 21 slightly above the channel 31 and allow the entrance of the air under pressure from the storage tank 34. Thus air will be forced through the channel 30 to the lower end of the cylinder, thus tending to hold the piston 12 in the upward position in which it is driven by the shock. This will tend to prevent the quick recoil of the spring and will tend to allow the frame and body of the vehicle to remain in the same horizontal position that it maintained before the shock was delivered. The dash pot 19 will tend to adjust itself to its normal position with the piston 37 midway of the ends by means of springs 50 and 51 secured to the lower end of the cylinder and supported upon a bracket 53 depending from the lower end of the casting 7. This regulation of the dash pot will draw the valve piston 21 back so as to close the inlet 31 and allow the channel 29 to communicate with the atmosphere, and thus relieve the pressure below the piston, allowing it to sink gradually back to its normal position and allow the spring to again expand to the position it occupied before the shock was delivered.

This same sequence of operations will take place when the wheel drops into a depression in the roadway, tending to expand the spring 4 relative to the vehicle, and to prevent the vehicle following the downward movement of the wheel axle, air will be admitted under pressure from the tank 34 through the channels 32 and 26 to the upper end of the piston, tending to force it downwardly with the spring and axle and maintain the body of the vehicle in its normal position. When the depression has been passed the action of the dash pot 19 will tend to throw the valve again upwardly to close the inlet for the pressure fluid and to allow the exhaust thereof through the channel 27. The dash pot will be similar in its action to other dash pots in that when the piston 37 is driven upwardly in the cylinder, when a shock is delivered upon the wheel axle, there will be a tendency to force the liquid above the piston through the by-pass 40 to the opposite end of the piston, and the speed of this adjustment may be regulated by the valve 41.

The advantages of this construction lie in the fact that the vehicle spring may be compressed relative to the vehicle without imparting the upward thrust of the shock to the frame of the vehicle as is ordinarily the case. The spring 4 of the vehicle will be compressed and the tendency will then be for the spring to expand and throw the body of the vehicle upwardly as the expansion of the spring after compression occurs. The spring will not abruptly expand when this absorber is used, but will expand slowly allowing the frame of the vehicle to remain in its normal position relative to the roadway, unaffected to any marked degree by the force of the shock. The action of the valve will be to allow the parts to gradually assume their original position without any marked effect upon the frame of the vehicle. The further objects and advantages of this construction will be apparent to one skilled in the art without further description.

What I claim as new and desire to protect by Letters Patent is:

1. The combination with a vehicle including a frame, a wheel axle, and a vehicle spring between said axle and frame; of a cylinder secured to said frame, a piston, a piston rod thereon secured to said axle, channels at the upper and lower ends of said cylinder normally open to the atmosphere, means actuated by the movement of said wheel axle and piston rod to close one or the other of said channels and admit air under pressure at the closed side for the purpose described.

2. The combination with a vehicle including a frame, an axle, and a vehicle spring between said frame and axle; of a cylinder on said frame, a piston in said cylinder, a piston rod thereon secured to said axle, lateral outlets at the upper and lower ends of said cylinder, and means acting when said piston is moved in said cylinder to close the outlet behind the moving piston and to allow entrance for air under pressure in the manner described.

3. The combination with a vehicle including a frame, an axle and a vehicle spring between said frame and axle; of a cylinder, a piston therein, a piston rod on said piston, said cylinder and piston rod being secured to said frame and axle, fluid ports at the ends of said cylinder and valve-controlled means automatically operated by the movement of said piston rod to admit fluid under pressure through said ports.

4. A cylinder for attachment to the frame of a vehicle, a piston in said cylinder having a piston rod connecting the same with the axle of said vehicle, a valve cylinder, a piston valve therein, passages from each end of said cylinder to said valve cylinder, and means on said piston rod to move said valve, whereby air under pressure may be introduced into said passages above said piston when said piston is moved downwardly and below said piston when said piston is moved upwardly for the purpose described.

5. A cylinder for attachment to the frame of a vehicle, a piston in said cylinder, a piston rod thereon adapted for attachment to the axle of a vehicle, a piston valve adjacent said cylinder, passages from the upper and lower ends of said cylinder controlled by said valve, adapted to admit air under pressure above or below said piston as it moves down or up respectively, and means regulating said valve to allow exhaust of said air thereafter.

6. In a shock absorber, a cylinder having fluid passages at the upper and lower ends, a piston in said cylinder, a piston rod thereon, a piston valve controlling the said fluid passages, means secured to said piston rod to move said piston valve to allow entrance to said cylinder of air under pressure above said piston when said piston moves downwardly, and below said piston when said piston moves upwardly, and equalizing means on said valve to allow gradual outlet for said air from said cylinder.

7. The combination with a vehicle including a frame, an axle and a vehicle spring between said frame and axle; of a cylinder a piston and piston rod working therein, said cylinder and piston rod being secured to said frame and axle, fluid ports at the ends of said cylinder, and valve controlled means to admit air under pressure through said ports to the receding side of said piston as it is moved in said cylinder.

8. The combination with a vehicle including a frame, an axle and a spring between said frame and axle; of a cylinder and piston between the frame and axle, fluid ports at the ends of said cylinder, valves regulating said ports, means actuated by the movement of said piston to operate said valves to admit fluid under pressure on the receding side of said piston and to permit the vent of said fluid thereafter.

9. The combination with a vehicle, including a frame, an axle and a spring; of a cylinder and piston between said frame and axle, valve controlled ports at each end of said cylinder, means to move said valves to admit fluid under pressure from an independent source to the end port of said cylinder from which said piston is moved, and means to allow the vent of said fluid gradually thereafter.

10. The combination with a vehicle including a frame, an axle and a spring between said frame and axle; of a cylinder, a piston reciprocable therein, ports at each end of said cylinder, a source of fluid under pressure and means to automatically admit fluid under pressure to said cylinder to assist in maintaining a uniform support of said spring to said frame.

11. In a shock absorber, a cylinder, a piston therein, fluid ports at each end of said cylinder, valves controlled by the movement of said piston to admit fluid under pressure behind said piston as it is moved, to resist its return movement and means independent of said piston to allow exit of fluid from said cylinder thereafter.

12. In a shock absorber, a cylinder, a piston therein, a fluid port at one end of said cylinder and means to regulate the fluid pressure on said piston to assist the movement of said piston in either direction.

In testimony whereof, I hereunto affix my signature this the 3rd day of August, 1923.

HOWARD R. HUGHES, Jr.